(12) United States Patent
Tsuzuki

(10) Patent No.: US 9,538,472 B2
(45) Date of Patent: Jan. 3, 2017

(54) FUNCTION PERFORMING APPARATUS

(71) Applicant: Brother Kogyo Kabushiki Kaisha, Nagoya-shi, Aichi-ken (JP)

(72) Inventor: Ryosuke Tsuzuki, Anjo (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/847,507

(22) Filed: Sep. 8, 2015

(65) Prior Publication Data

US 2016/0073348 A1 Mar. 10, 2016

(30) Foreign Application Priority Data

Sep. 8, 2014 (JP) ................... 2014-182554

(51) Int. Cl.
 G06F 3/12 (2006.01)
 G06K 15/00 (2006.01)
 H04W 52/02 (2009.01)
 H04W 4/00 (2009.01)
 H04N 1/00 (2006.01)

(52) U.S. Cl.
 CPC ...... *H04W 52/0229* (2013.01); *G06K 15/4055* (2013.01); *H04N 1/00127* (2013.01); *H04N 1/00896* (2013.01); *H04N 1/00904* (2013.01); *H04W 4/008* (2013.01); *G06F 3/1221* (2013.01); *G06F 3/1236* (2013.01); *G06F 3/1292* (2013.01); *Y02B 60/50* (2013.01)

(58) Field of Classification Search
 None
 See application file for complete search history.

(56) References Cited

U.S. PATENT DOCUMENTS

| | | | |
|---|---|---|---|
| 9,100,774 B2 | 8/2015 | Suzuki et al. | |
| 2013/0229672 A1 | 9/2013 | Naruse | |
| 2013/0231047 A1* | 9/2013 | Ogawa | H04B 5/0031 455/41.1 |

(Continued)

FOREIGN PATENT DOCUMENTS

| | | |
|---|---|---|
| JP | 2013-186505 A | 9/2013 |
| JP | 2013-214804 A | 10/2013 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Dov Popovici
(74) *Attorney, Agent, or Firm* — Banner & Witcoff, Ltd.

(57) ABSTRACT

An apparatus includes a first wireless interface and a controller. The controller includes a setting information memory configured to store setting information indicating a selected result selected by a user among a first setting and a second setting, the first setting indicating that target data is to be sent to an external apparatus via the first wireless interface, and the second setting indicating that the target data is not sent to the external apparatus. The controller is configured to perform: maintaining an operation state of the function performing apparatus in a power saving state, in a case where a predetermined notice is obtained from the first wireless interface under a situation where the operation state of the function performing apparatus is the power saving state and the setting information memory stores the setting information indicating the second setting.

15 Claims, 10 Drawing Sheets

(56) References Cited

U.S. PATENT DOCUMENTS

2013/0260683 A1 10/2013 Suzuki et al.
2015/0188611 A1* 7/2015 Tsuzuki .................. H04B 5/02
　　　　　　　　　　　　　　　　　　　　455/41.1

* cited by examiner (First and Second Embodiments)

(First Embodiment)

(First and Second Embodiments)

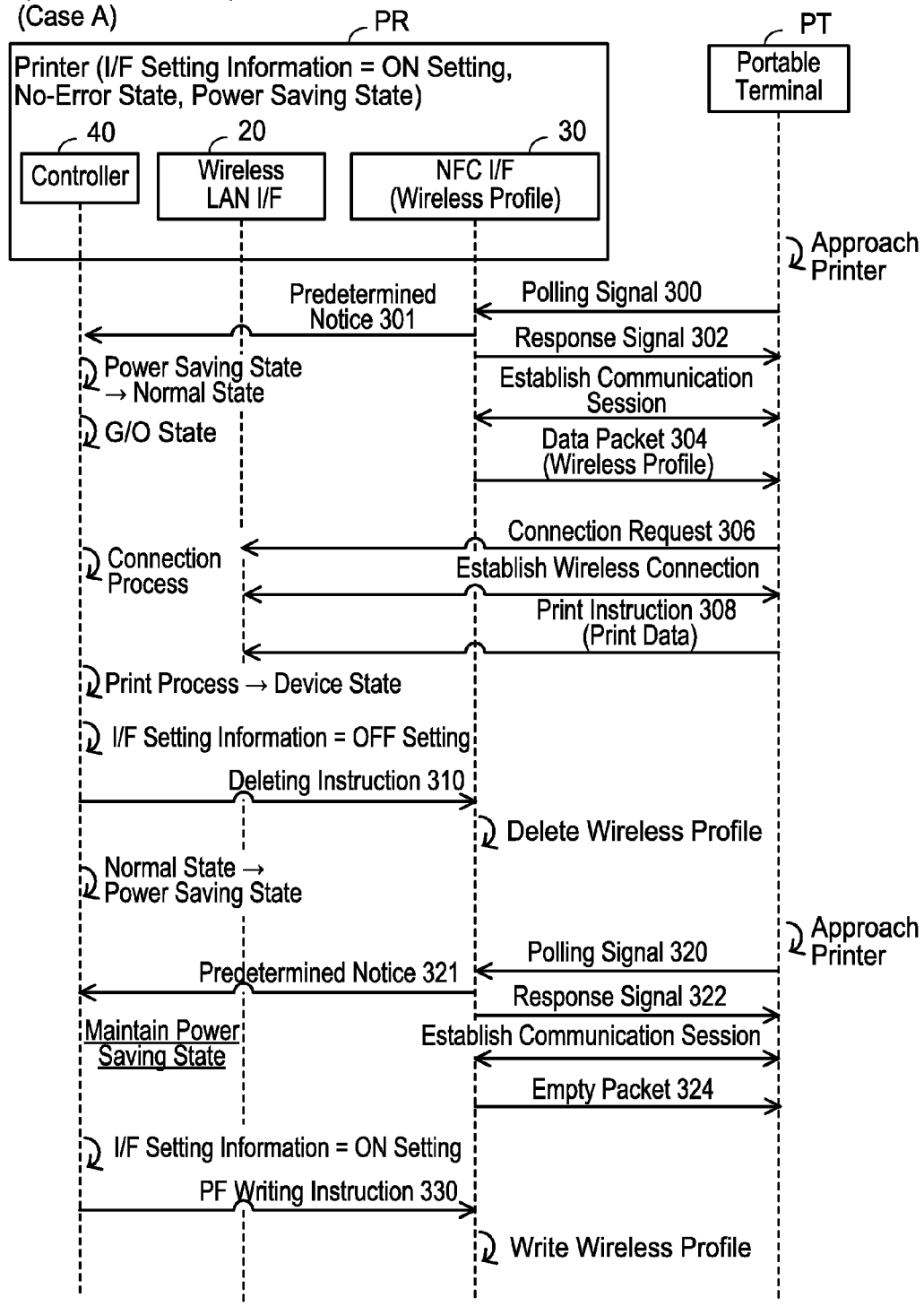

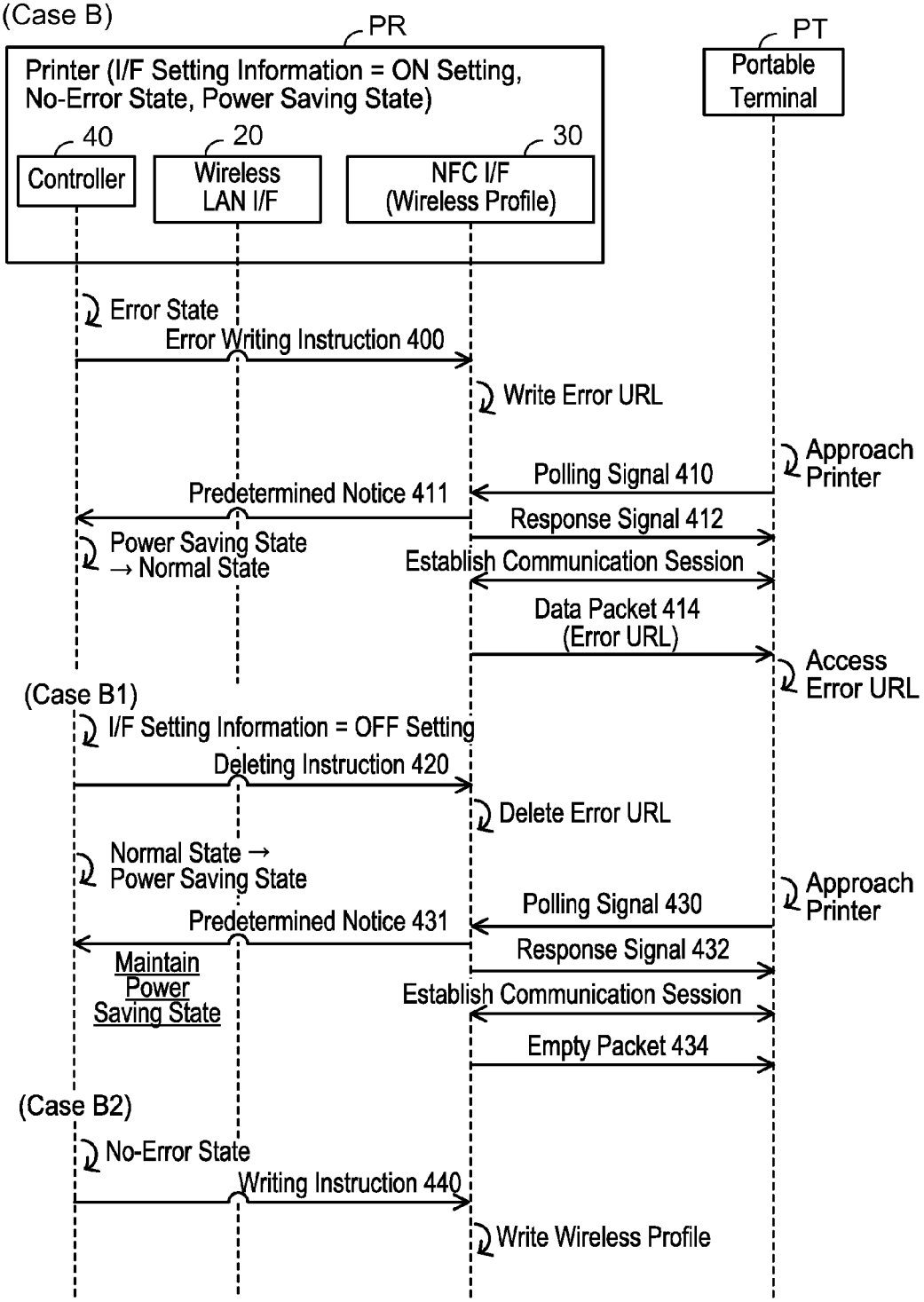

FIG. 8

(No-Error State)

| | I/F Setting Information SI | | Data in I/F Memory 34 | Operation When Obtaining Predetermined Notice |
|---|---|---|---|---|
| First Situation | ON Setting | | Wireless Profile | Power Saving State → Normal State |
| Second Situation | OFF Setting | | No (Modification) Status Information (OFF Setting, Power ON, etc) | Maintain Power Saving State |

(Error State)

| | I/F Setting Information SI | | Data in I/F Memory 34 | Operation When Obtaining Predetermined Notice |
|---|---|---|---|---|
| Third Situation | ON Setting | | Error URL | Power Saving State → Normal State (Second Embodiment) Maintain Power Saving State |
| Fourth Situation | OFF Setting | | No (Modification) Status Information (OFF Setting, Power ON, etc) | Maintain Power Saving State |

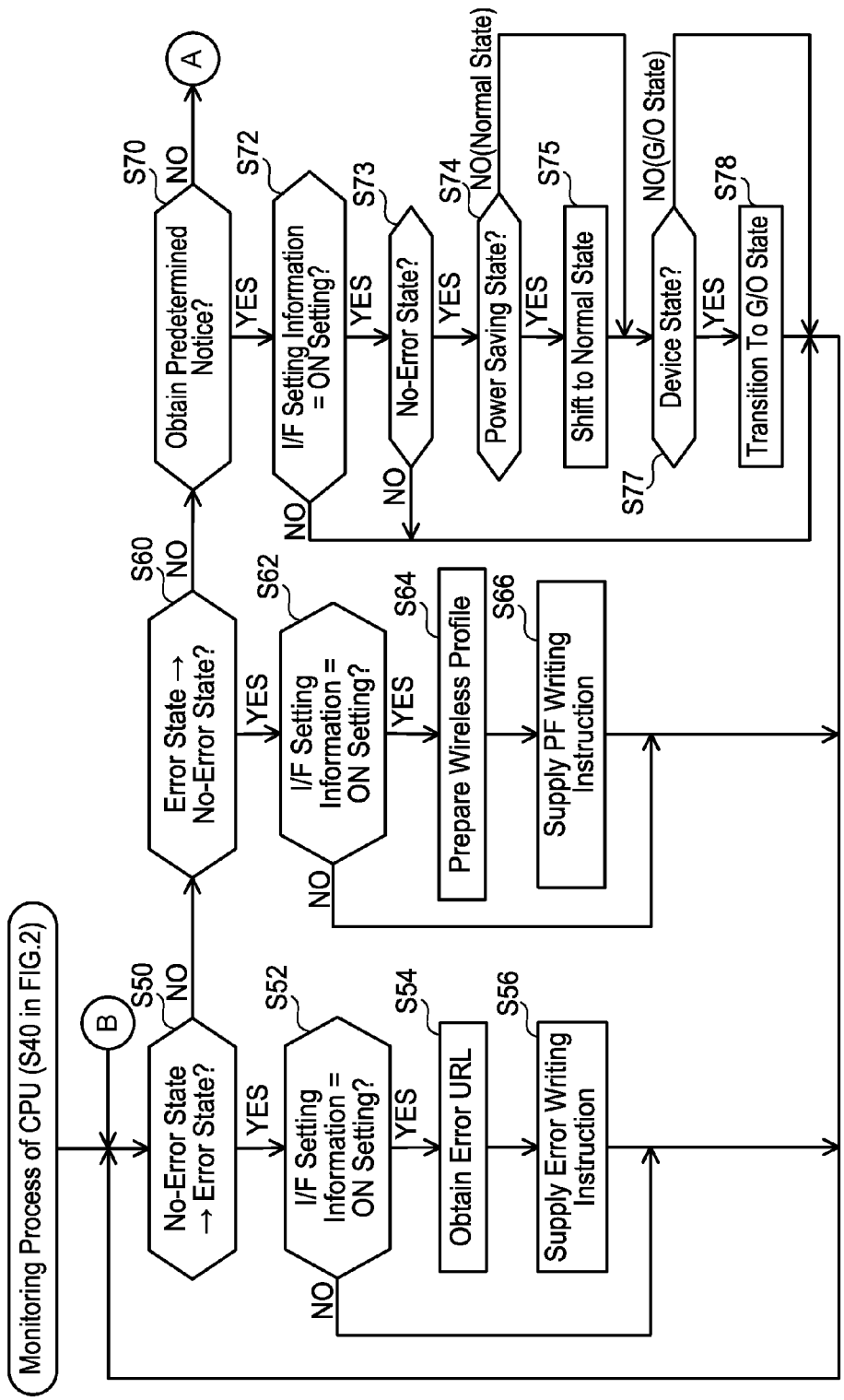

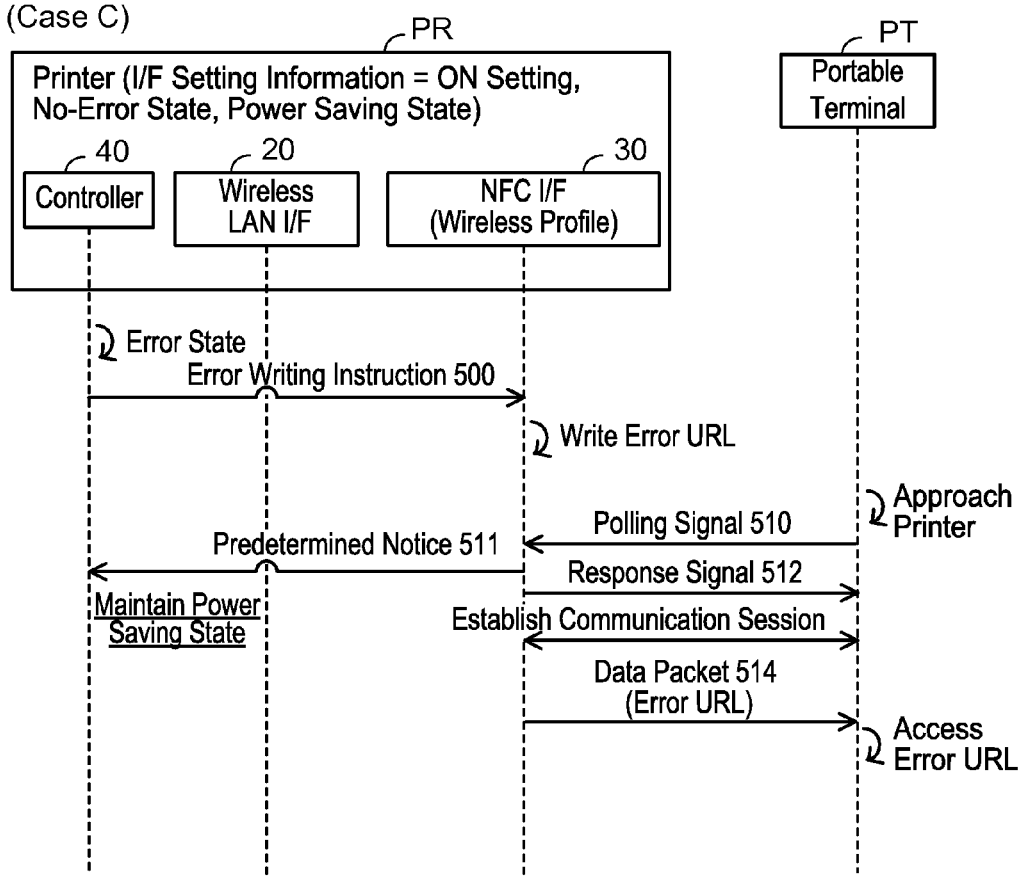

FUNCTION PERFORMING APPARATUS

CROSS-REFERENCE TO RELATED APPLICATION

This application claims priority to Japanese Patent Application No. 2014-182554, filed on Sep. 8, 2014, the contents of which are hereby incorporated by reference into the present application.

TECHNICAL FIELD

The present specification discloses a function performing apparatus in which an operation state is shifted between a normal state and a power saving state.

BACKGROUND ART

A multifunction apparatus that comprises NFC (abbreviation of a Near Field Communication) interface for performing an NFC wireless communication, a wireless LAN interface for performing a WFD (Wi-Fi Direct (registered trademark)) scheme wireless communication, and a print performing unit is known. In a case where NFC information which includes a process execution instruction, a SSID (Service Set Identifier), and a BSSID (Basic Service Set Identifier) is received from a portable terminal via the NFC interface, the multifunction apparatus operates in a group owner state (called "G/O state" hereinbelow) of a WFD scheme so as to form a wireless network of the WFD scheme. Then, the multifunction apparatus sends a wireless setting of the wireless network to the portable terminal via the NFC interface. Consequently, since the portable terminal participates in the wireless network, the multifunction apparatus uses the wireless network so as to receive print data from the portable terminal via the wireless LAN interface. The multifunction apparatus supplies the print data to the print performing unit and performs a print function.

SUMMARY

In the above multifunction apparatus, no consideration whatsoever is given to shifting the operation state of the multifunction apparatus between a normal state and a power saving state. Therefore, in the above multifunction apparatus, no consideration whatsoever is given to a relationship between a communication via the NFC interface and a shift of the operation state of the multifunction apparatus. The present specification provides a technique for appropriately controlling an operation state of a function performing apparatus.

A function performing apparatus taught in the present specification may comprise a first wireless interface; a function performing unit configured to perform a specific function; and a controller. The first wireless interface may comprise: an interface memory in which first target data is to be written, the first target data including data for performing communication related to the specific function between the function performing apparatus and an external apparatus; and a processor configured to establish a communication session with the external apparatus via the first wireless interface so as to send the first target data in the interface memory to the external apparatus, in a case where a request signal for establishing the communication session is received from the external apparatus under a situation where the first target data has been written in the interface memory. The controller may comprise: a setting information memory configured to store setting information indicating a selected result selected by a user among a first setting and a second setting, the first setting indicating that the first target data is to be sent to the external apparatus, and the second setting indicating that the first target data is not sent to the external apparatus. The controller may be configured to perform: obtaining, from the processor, a predetermined notice indicating that the request signal has been received from the external apparatus; and shifting an operation state of the function performing apparatus between a normal state and a power saving state, a power consumption of the function performing unit in the power saving state being lower than a power consumption of the function performing unit in the normal state. The shifting of the operation state may include: shifting the operation state of the function performing apparatus from the power saving state to the normal state, in a case where the predetermined notice is obtained from the processor under a situation where the operation state of the function performing apparatus is the power saving state and the setting information memory stores the setting information indicating the first setting; and maintaining the power saving state without shifting the operation state of the function performing apparatus to the normal state, in a case where the predetermined notice is obtained from the processor under a situation where the operation state of the function performing apparatus is the power saving state and the setting information memory stores the setting information indicating the second setting.

A method and computer-readable instructions for implementation of the communication apparatus described above, and a non-transitory computer-readable recording medium in which the computer-readable instructions are stored, are also novel and useful. Furthermore, a system comprising the function performing apparatus and the external apparatus is also novel and useful.

BRIEF DESCRIPTION OF DRAWINGS

FIG. 6 shows a sequence diagram of a Case A in which a wireless profile is sent.
FIG. 7 shows a sequence diagram of a Case B in which an error URL is sent.
FIG. 8 shows printer operations under various situations.
FIG. 9 shows a flowchart of a monitoring process of CPU in a second embodiment.
FIG. 10 shows a sequence diagram of the second embodiment.

EMBODIMENTS

First Embodiment

Figure 1:
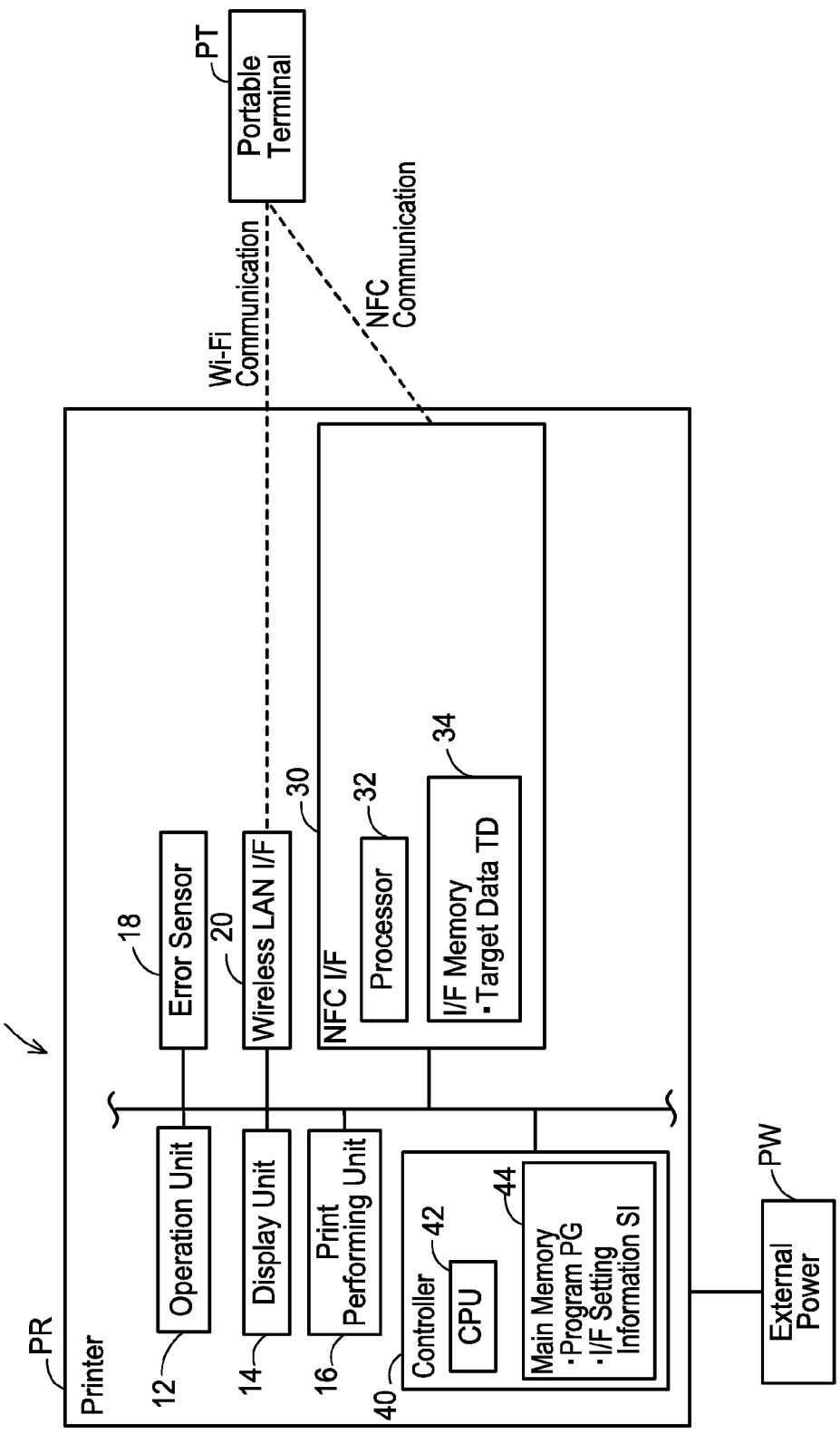
FIG. 1 shows a configuration of a communication system.

Configuration of Communication System 2; FIG. 1

As shown in FIG. 1, a communication system 2 comprises a printer PR and a portable terminal PT. Each of the apparatuses PR and PT is able to perform a wireless communication in accordance with a Wi-Fi scheme (called "Wi-Fi communication" hereinbelow) and a wireless communication in accordance with NFC (abbreviation of a Near Field Communication) scheme (called "NFC communication" hereinbelow).

(Configuration of Printer PR)

The printer PR is a peripheral apparatus (that is, a peripheral apparatus of the portable terminal PT) that is able to perform a print function. The printer PR comprises an operation unit 12, a display unit 14, a print performing unit 16, an error sensor 18, wireless LAN (abbreviation of a Local Area Network) interface 20, an NFC interface 30, and a controller 40. The components 12 to 40 are connected to a bus line (reference sign omitted). Interface will be written as "I/F" below.

In a situation where the printer PR power source is in an ON state, the printer PR obtains power from an external power source PW, as a result of which power is supplied to the components 12 to 40. Also, in the printer PR the power supply to the components 12 to 40 is controlled in accordance with a printer PR operation state (that is, a normal state and a power saving state, which will be described later).

The operation unit 12 comprises a plurality of buttons. A user can provide the printer PR with various instructions by operating the operation unit 12. The display unit 14 is a display for displaying various types of information. The print performing unit 16 is an inkjet, laser or other type of printing mechanism. The error sensor 18 is a sensor for detecting errors that occur in the printer PR, and, for example, includes a sensor for detecting the remaining amount of consumables (toner, ink, and so forth) used in printing, and a sensor for detecting whether or not a paper jam has occurred.

The wireless LAN I/F 20 is a wireless I/F for performing a Wi-Fi communication in accordance with a Wi-Fi scheme. The Wi-Fi scheme, for example, is a wireless communication scheme for performing a wireless communication in accordance with IEEE (abbreviation of The Institute of Electrical and Electronics Engineers, Inc.) standard 802.11, and standards conforming thereto (e.g. 802.11a, 11b, 11g, 11n, and so forth). The wireless LAN I/F 20, in particular, supports a WFD (abbreviation of a Wi-Fi Direct) scheme. The WFD scheme is a wireless communication scheme described in a "Wi-Fi Peer-to-Peer (P2P) Technical Specification Version 1.1" prepared by the Wi-Fi Alliance.

The NFC I/F 30 is a wireless I/F for performing an NFC communication (that is, a type of so-called near field wireless communication) in accordance with an NFC scheme. The NFC scheme, for example, is a wireless communication scheme based on the international standard ISO/IEC 21481 or 18092. As types of I/Fs for performing NFC communications, an I/F called NFC Forum device and an I/F called NFC Forum tag are known. The NFC I/F 30 is an NFC Forum tag, and functions as an NFC IC tag.

The NFC I/F 30 comprises a processor 32 and an I/F memory 34. The processor 32 is able to communicate with the controller 40, and writes target data TD to be sent to the portable terminal PT into the I/F memory 34 in accordance with a writing instruction obtained from the controller 40, and to delete the target data TD from the I/F memory 34 in accordance with a deleting instruction obtained from the controller 40. Also, in a case where a polling signal is received from the portable terminal PT, the processor 32 sends to the portable terminal PT a response signal in response to the polling signal and establishes a communication session with the portable terminal PT. Prior to establishing the communication session with the portable terminal PT, the processor 32 reads target data TD which has been written in the I/F memory 34 beforehand from the I/F memory 34, and uses the communication session to send the target data TD to the portable terminal PT.

The difference between the wireless LAN I/F 20 and the NFC I/F 30 will be herein explained. A communication speed (e.g. a maximum communication speed of 11 to 600 Mbps) of a wireless communication via the wireless LAN I/F 20 is faster than a communication speed (e.g. a maximum communication speed of 100 to 424 Kbps) of a wireless communication via the NFC I/F 30. Also, a carrier frequency (e.g. 2.4 GHz band or 5.0 GHz band) of the wireless communication via the wireless LAN I/F 20 differs from a carrier frequency (e.g. 13.56 MHz band) of the wireless communication via the NFC I/F 30. In addition, a maximum distance (e.g. approximately 100 m) over which the wireless communication is capable of being performed via the wireless LAN I/F 20 is greater than a maximum distance (e.g. approximately 10 cm) over which the wireless communication is capable of being performed via the NFC I/F 30.

The controller 40 comprises a CPU 42 and a main memory 44. The CPU 42 is a processor configured to perform various processing in accordance with a program PG stored in the main memory 44. The main memory 44 is configured by RAM, ROM or the like, and in addition to the above program PG, also stores I/F setting information SI.

The I/F setting information SI indicates either an ON setting for target data TD in the NFC I/F 30 to be sent to the portable terminal PT, or an OFF setting for the target data TD not to be sent to the portable terminal PT. In a case where a user wants the target data TD to be sent to the portable terminal PT, the user can operate the operation unit 12 and select the ON setting from among the ON setting and the OFF setting. As a result, I/F setting information SI indicating the ON setting is stored in the main memory 44. In a case where the user does not want the target data TD to be sent to the portable terminal PT, the user can select the OFF setting from among the ON setting and the OFF setting. As a result, I/F setting information SI indicating the OFF setting is stored in the main memory 44.

(Operation State of Printer PR)

The printer PR operation state is shifted between the normal state and the power saving state. The normal state is a state in which power is supplied to the operation unit 12, the display unit 14, the print performing unit 16, the error sensor 18, the wireless LAN I/F 20, the NFC I/F 30 (i.e. the processor 32 and the I/F memory 34) and the controller 40 (i.e. the CPU 42 and the main memory 44). That is, the normal state is the state in which power is supplied to all of the components 12 to 40 comprising the printer PR. The power saving state is a state in which power is not supplied to the display unit 14 and the print performing unit 16 among the components 12 to 40 to which power is supplied in the normal state. That is, in the normal state, power is supplied to the light source of the display unit 14, and therefore the display unit 14 is in a lighting-on state, and in the power saving state, power is not supplied to the light source of the display unit 14, and therefore the display unit 14 is in an lighting-off state. For example, in a case where the print performing unit 16 comprises a laser print mechanism, in the normal state, power is supplied to a fixing device of the print performing unit 16, and therefore the fixing device is in a drive state, and in the power saving state, power is not supplied to the fixing device, and therefore the fixing device is in an idle state. Furthermore, for example, in a case where the print performing unit 16 comprises an inkjet print mechanism that uses a piezoelectric element, in the normal state, power is supplied to the piezoelectric element, and therefore the piezoelectric element is in a deformed state, and in the power saving state, power is not supplied to the piezoelectric element, and therefore the piezoelectric element is not in a deformed state. Thus, a power consumption of the display unit 14 and the print performing unit 16 in the power saving state is lower than the power consumption of the display unit 14 and the print performing unit 16 in the normal state.

In the printer PR that comprises the components 12 to 40 of this embodiment, the minimum condition for realizing the power saving state is that power is supplied to the operation unit 12, the wireless LAN I/F 20, and the controller 40, and power is not supplied to the print performing unit 16. That is, in a modification, power may or may not be supplied to at least one of the display unit 14, the error sensor 18, and the NFC I/F 30 in the power saving state.

In addition, in another modification embodiment, a configuration in which power is not supplied to the print performing unit 16 in the power saving mode may not be adopted, and instead a configuration in which less power is supplied to the print performing unit 16 than in the normal mode may be adopted. In another modification, the configuration may be such that a clock frequency for operating at least one of the processor 32 of the NFC I/F 30 or the CPU 42 of the controller 40 is lower in the power saving state than the clock frequency of the normal state. And in another modification, a RAM configuring the main memory 44 of the controller 40 may be operate this RAM in the self refresh mode in the normal state, the RAM may be operated in the self refresh mode in the power saving state. In both of the above configurations, it is possible to make the power consumption of the printer PR in the power saving state lower than the power consumption of the printer PR in the normal state. Generally speaking, in this embodiment, the power consumption of the print performing unit 16 in the power saving state should be lower than the power consumption of the print performing unit 16 in the normal state, and, in addition, as an option, the power consumption of at least of one piece of hardware from among the NFC I/F 30 and the controller 40 should be lower in the power saving state than the power consumption of this piece of hardware in the normal state.

The CPU 42 of the controller 40 shifts the operation state of the printer PR between the normal state and the power saving state as follows. When a predetermined event occurs while the operation state of the printer PR is the normal state, the CPU 42 maintains the normal state and perform process corresponding to the event. When a predetermined time has passed without the predetermined event occurring while the operation state of the printer PR is the normal state, the CPU 42 stops the supply of power to the display unit 14 and the print performing unit 16 and shifts the operation state of the printer PR from the normal state to the power saving state. Also, when the predetermined event occurs while the operation state of the printer PR is the power saving state, the CPU 42 resumes the supply of power to the display unit 14 and the print performing unit 16, shifts the operation state of the printer PR from the power saving state to the normal state, and thereafter performs the process corresponding to the event.

The above predetermined event, for example, includes the operation unit 12 being operated by the user, print data representing a print-target image being received via the wireless LAN I/F 20, and an NFC communication via the NFC I/F 30 occurring. In a case where the operation unit 12 is operated by the user, the CPU 42 displays a predetermined screen on the display unit 14. In a case where the print data is received, the CPU 42 supplies the print data to the print performing unit 16 and to cause the print performing unit 16 to perform printing in accordance with the print data. Also, in a case where an NFC communication via the NFC I/F 30 occurs, the CPU 42 obtains a predetermined notice from the processor 32 of the NFC I/F 30, and, for example, to cause the printer PR to transition to the group owner state of the WFD scheme (refer to S78 of FIG. 3).

(Configuration of Portable Terminal PT)

The portable terminal PT is a portable terminal apparatus, such as a mobile telephone (e.g. a smartphone), a PDA, a notebook PC, a tablet PC, a portable music reproduction apparatus, and a portable video reproduction apparatus. The portable terminal PT comprises a wireless LAN I/F not shown in the drawings, and is able to perform a Wi-Fi communication. In particular, the wireless LAN I/F of the portable terminal PT supports the WFD scheme. The portable terminal PT also comprises an NFC I/F not shown in the drawings, and is able to perform an NFC communication. Furthermore, the NFC I/F of the portable terminal PT is an NFC Forum device. The NFC I/F of the portable terminal PT is able to operate as a reader among reader/writer modes defined by the NFC Forum, to perform an NFC communication with the NFC Forum tag which is the NFC I/F 30 of the printer PR, and to receive a target-data TD written beforehand in the NFC I/F memory 34 of the printer PR.

Figure 2:
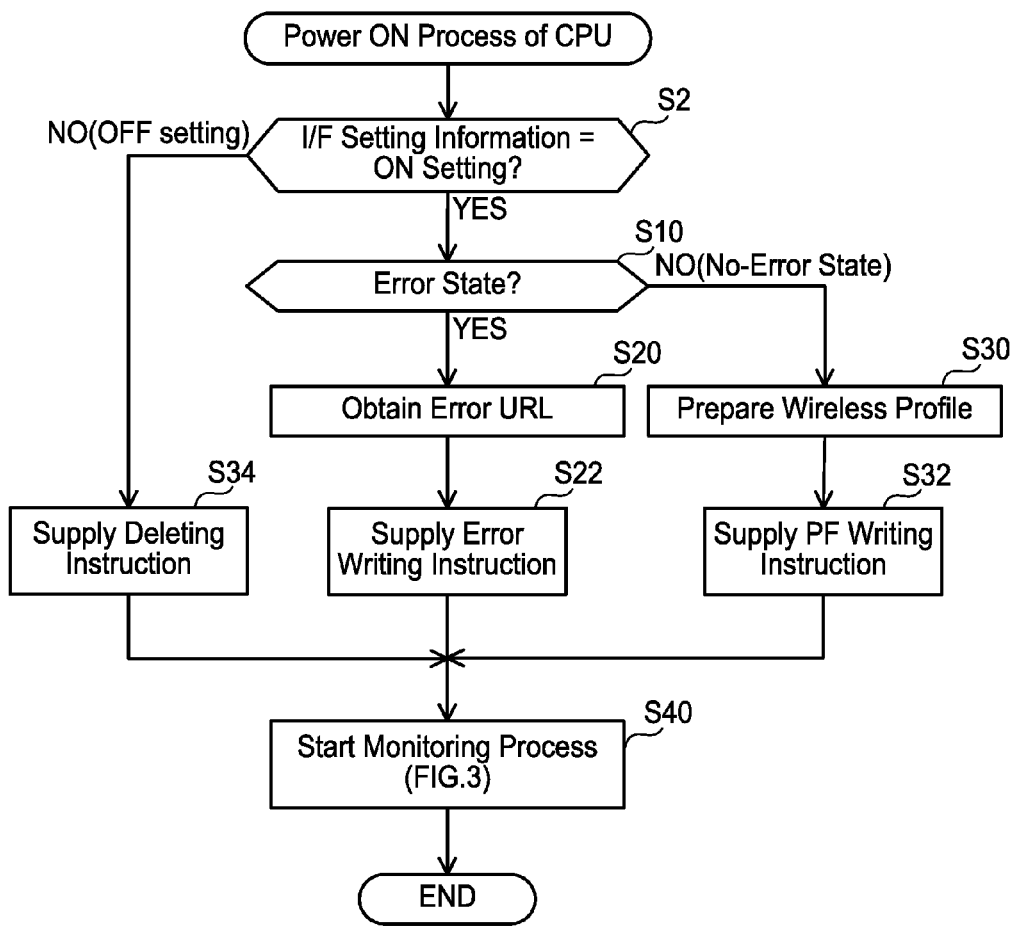
FIG. 2 shows a flowchart of a power ON process of a CPU.

(Power ON Process of CPU 42; FIG. 2)

Next, a power ON process performed by the CPU 42 of the controller 40 will be explained by referring to FIG. 2. The CPU 42 performs the power ON process when the power source of the printer PR is shifted from the OFF state to the ON state.

In S2, the CPU 42 determines whether the I/F setting information SI in the main memory 44 indicates the ON setting or the OFF setting. In a case where the I/F setting information SI is determined to be the OFF setting (S2: NO), the CPU 42 supplies the NFC I/F 30 with a deleting instruction for deleting the target data TD from the I/F memory 34 in S34. Thus, in a case where target data TD is stored in the I/F memory 34, the processor 32 of the NFC I/F 30 deletes the target data TD from the I/F memory 34. When S34 ends, proceeds to S40. Alternatively, in a case where the CPU 42 determines that the I/F setting information SI indicates the ON setting (S2: YES), proceeds to S10.

In S10, the CPU 42 determines whether the printer PR is in an error state or a no-error state. The error state is a state in which the printer PR is unable to perform the print function, and the no-error state is a state in which the printer PR is able to perform the print function. Specifically, in a case where an output value of the error sensor 18 indicates an error (e.g. consumables have run out, or a paper jam), the CPU 42 determines that the printer PR is the error state (S10: YES), and proceeds to S20, and in a case where the output value of the error sensor 18 does not indicate an error, the CPU 42 determines that the printer PR is the no-error state (S10: NO), and proceeds to S30.

In S20, the CPU 42 obtains from the main memory 44 an error URL (abbreviation of Uniform Resource Locator) corresponding to the error that is currently occurring in the printer PR. Error URLs corresponding to various errors are stored beforehand in the main memory 44. Each error URL indicates a location in a server (not shown in the drawing) located on the internet by the vendor of the printer PR. The server stores web pages indicating methods for resolving the various errors. Therefore, for example, when the portable terminal PT receives an error URL from the printer PR and accesses the server according to the error URL, the portable terminal PT is able to display the web page. As a result of this, the user of the portable terminal PT is able to resolve the error currently occurring in the printer PR.

Next, in S22, the CPU 42 supplies the NFC I/F 30 with an error writing instruction that includes the error URL obtained in S20. Consequently, the processor 32 of the NFC I/F 30 writes (i.e., stores) the error URL included in the error writing instruction in the I/F memory 34 as the target data TD. When S22 ends, proceeds to S40.

In S30, the CPU 42 prepares a wireless profile. In the process of S78 of FIG. 3, which will be described later, the printer PR operates in the group owner state of the WFD scheme (called the "G/O state" hereinbelow), and forms a wireless network of the WFD scheme. The wireless profile prepared in S30 is information to be used in the wireless network. That is, the wireless profile prepared in S30 is information to be used in a wireless network capable of being formed in the future by the printer PR. Therefore, for example, the portable terminal PT is able to participate in the above wireless network upon receiving a wireless profile from the printer PR. As a result, for example, the portable terminal PT can send a printing instruction that includes the print data to the printer PR by using the above wireless network. The wireless profile prepared in S30 includes an SSID (abbreviation of Service Set Identifier), an authentication scheme, an encryption scheme, and a password. The CPU 42 prepares the SSID and the password by randomly selecting character strings. The CPU 42 also prepares a predetermined authentication scheme and encryption scheme. The CPU 42 stores the wireless profile in the main memory 44. In a case where a wireless profile is already stored in the main memory 44 here, the CPU 42 deletes the old wireless profile from the main memory 44 and stores the new wireless profile prepared in S30 in the main memory 44.

Next, in S32, the CPU 42 supplies the NFC I/F 30 with a PF writing instruction that includes the wireless profile prepared in S30. Consequently, the processor 32 of the NFC I/F 30 writes (i.e. stores) the wireless profile included in the PF writing instruction in the I/F memory 34 as the target data TD. When S32 ends, proceeds to S40.

In S40, the CPU 42 starts a monitoring process (refer to FIGS. 3 and 4, which will be described later). When S40 ends, the process of FIG. 2 ends.

(Monitoring Process of CPU 42; FIG. 3, FIG. 4)

Next, the monitoring process started in S40 of FIG. 2 will be explained by referring to FIGS. 3 and 4. In the monitoring process, the monitoring steps of S50, S60, and S70 of FIG. 3, and S80, S90, and S100 of FIG. 4 are performed sequentially.

In S50, the CPU 42 monitors a change in the printer PR from the no-error state to the error state. Specifically, in a case where the output value of the error sensor 18 changes from a state not indicating an error to a state indicating an error, the CPU 42 makes a determination of YES in S50, and proceeds to S52.

In S52, the CPU 42 determines whether the I/F setting information SI in the main memory 44 indicates the ON setting or the OFF setting. In a case where it is determined that the I/F setting information SI indicates the OFF setting (S52: NO), the CPU 42 skips S54 and S56, and returns to S50. Alternatively, in a case where it is determined that the I/F setting information SI indicates the ON setting (S52: YES), in S54, the CPU 42 obtains an error URL from the main memory 44, and in S56, supplies the NFC I/F 30 with an error writing instruction including the error URL obtained in S54. S54 and S56 are the same as S20 and S22 of FIG. 2. When S56 ends, the process returns to S50.

In S60, the CPU 42 monitors that the printer PR changes from the error state to the non-error state. Specifically, in a case where the output value of the error sensor 18 changes from a state indicating an error to a state that not indicating an error, the CPU 42 makes a determination of YES in S60, and proceeds to S62.

In S62, the CPU 42 determines whether the I/F setting information SI in the main memory 44 indicates the ON setting or the OFF setting. In a case where it is determined that the I/F setting information SI indicates the OFF setting (S62: NO), the CPU 42 skips S64 and S66, and returns to S50. Alternatively, in a case where it is determined that the I/F setting information SI indicates the ON setting (S62: YES), in S64, the CPU 42 prepares a wireless profile, and in S66, supplies the NFC I/F 30 with a PF writing instruction including the wireless profile prepared in S64. S64 and S66 are the same as S30 and S32 of FIG. 2. When S66 ends, the process returns to S50.

In S70, the CPU 42 monitors obtaining a predetermined notice from the processor 32 of the NFC I/F 30. The predetermined notice is a notice supplied from the processor 32 to the controller 40 in a case where the NFC I/F 30 receives a polling signal from the portable terminal PT (refer to S222 of FIG. 5). The CPU 42 makes a determination of YES in S70 when the predetermined notice is received from the processor 32, and proceeds to S72.

In S72, the CPU 42 determines whether the I/F setting information SI in the main memory 44 indicates the ON setting or the OFF setting. In a case where it is determined that the I/F setting information SI indicates the OFF setting (S72: NO), the CPU 42 skips S74 to S78, and returns to S50. Alternatively, in a case where it is determined that the I/F setting information SI indicates the ON setting (S72: YES), in S74, the CPU 42 determines whether the operation state of the printer PR is the power saving state or the normal state. In a case where it is determined that the operation state of the printer PR is the power saving state (S74: YES), in S75, the CPU 42 resumes supplying power to the display unit 14 and the print performing unit 16, shifts the operation state of the printer PR from the power saving state to the normal state, and proceeds to S76. Alternatively, in a case where it is determined that the current operation state of the printer PR is the normal state (S74: NO), the CPU 42 skips S75 and proceeds to S76.

In S76, the CPU 42 determines whether the printer PR is the no-error state or the error state. S76 is the same as S10 of FIG. 2. In a case where it is determined that the printer PR is the error state (S76: NO), the CPU 42 skips S77 and S78, and returns to S50. Alternatively, in a case where it is determined that the printer PR is the no-error state (S76: YES), the CPU 42 proceeds to S77.

In S77, the CPU 42 determines whether the printer PR is the device state of the WFD scheme or is the G/O state of the WFD scheme. The device state is a state in which the printer PR is neither the G/O state of the WFD scheme nor a client state, and does not belong to a wireless network. In a case where it is determined that the printer PR is the device state (S77: YES), in S78, the CPU 42 transitions the printer PR from the device state to the G/O state, and forms a wireless network in which the printer PR operates in the G/O state. The wireless network is a wireless network that the wireless profile currently stored in the main memory 44 is to be used, and will be called "target wireless network" hereinbelow. At a time point when the target wireless network is formed in S78, only the printer PR belongs to the target wireless network; other apparatuses do not belong to this wireless network. When S78 ends, the process returns to S50. Alternatively, in a case where it is determined that the printer PR is the G/O state (S77: NO), the CPU 42 skips S78 and returns to S50.

As will be described in detail later, a connection request can be received from the portable terminal PT via the wireless LAN I/F 20 in a situation where the printer PR operates in the G/O state (refer to S100 of FIG. 4). In this case, the CPU 42 transitions the printer PR from the G/O state to the device state after having performed a connection process (S102) and a print process (S104), and terminates the target wireless network (S106). Although omitted from the drawing, in a case where a connection request has not been received during a predetermined time in a situation where the printer PR operates in the G/O state, the CPU 42 transitions the printer PR from the G/O state to the device state, and terminates the target wireless network.

Figure 3:
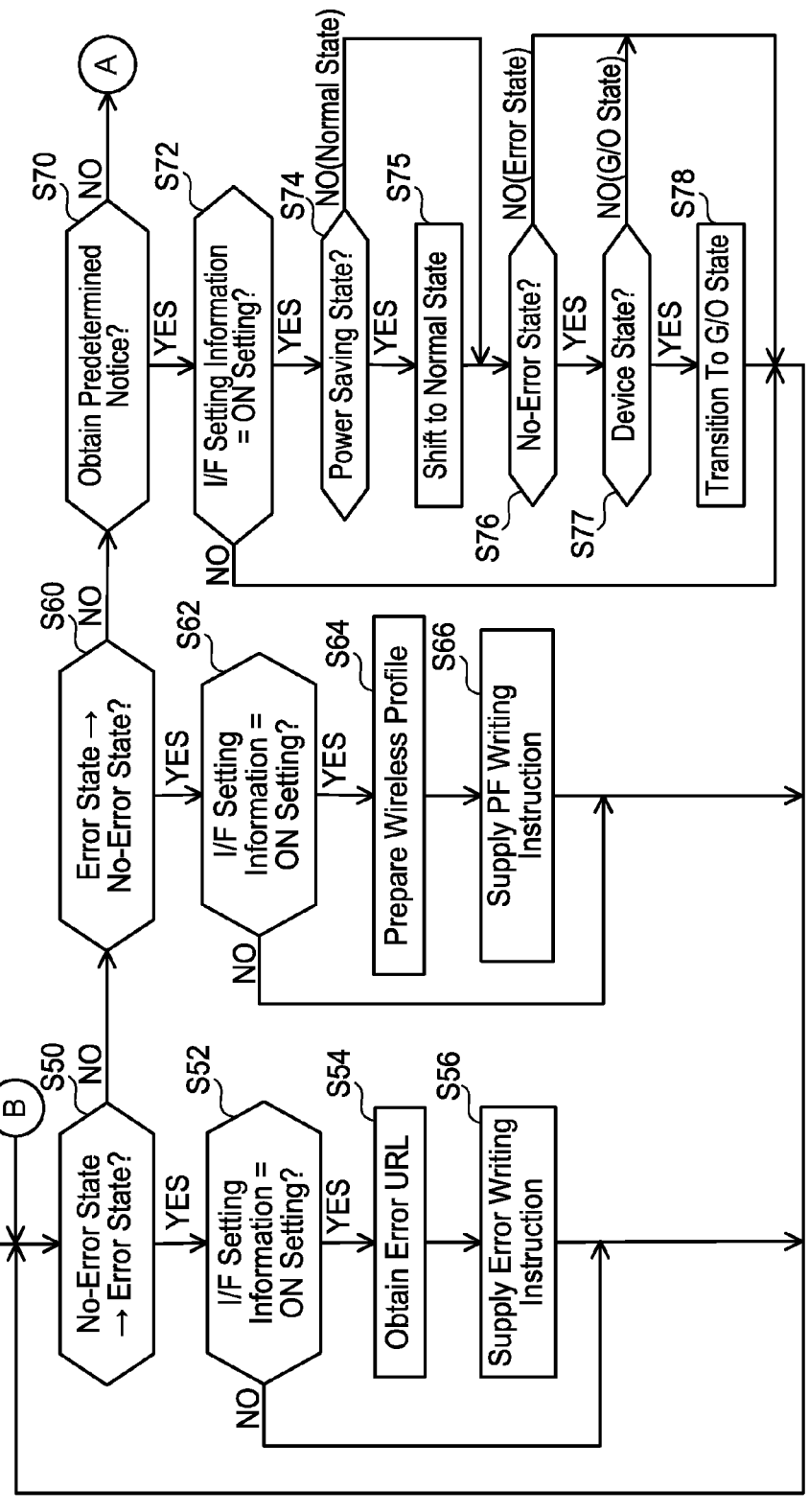
FIG. 3 shows a flowchart of a monitoring process of the CPU.
Figure 4:
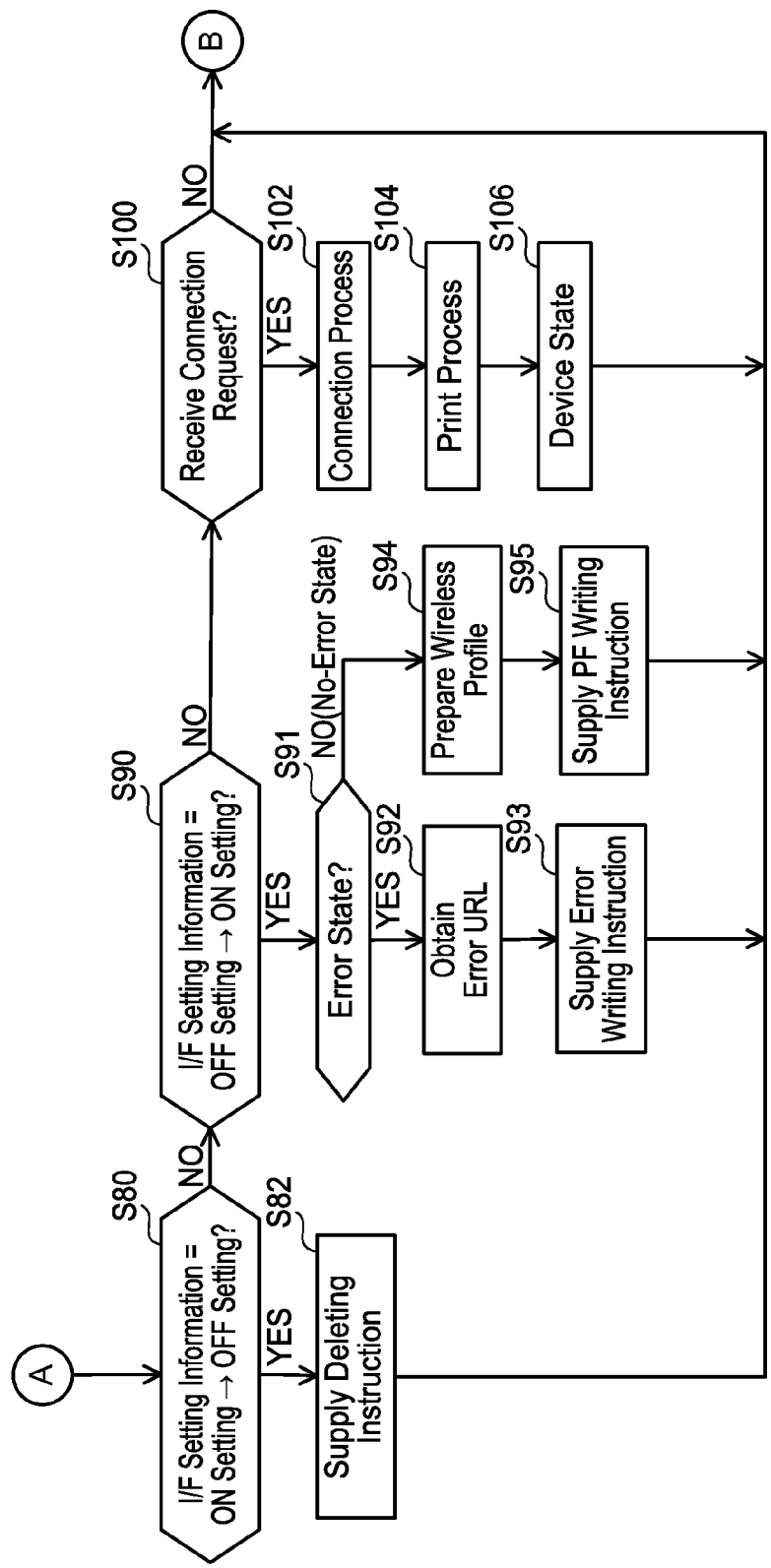
FIG. 4 shows a continuation of the flowchart of FIG. 3.

In S80 of FIG. 4, the CPU 42 monitors that I/F setting information SI indicating the ON setting in the main memory 44 is changed to I/F setting information SI indicating the OFF setting resulting from the user operating the operation unit 12. In a case where I/F setting information SI indicating the ON setting changes to I/F setting information SI indicating the OFF setting (S80: YES), the CPU 42 supplies the NFC I/F 30 with a deleting instruction for deleting the target data TD (i.e. wireless profile or error URL) from the I/F memory 34 in S82. Consequently, the processor 32 of the NFC I/F 30 deletes the target data TD from the I/F memory 34. The result of this is a state in which the target data TD is not sent to the portable terminal PT. When S82 ends, the process returns to S50 of FIG. 3.

In S90, the CPU 42 monitors that I/F setting information SI indicating the OFF setting in the main memory 44 is changed to I/F setting information SI indicating the ON setting resulting from the user operating the operation unit 12. In a case where I/F setting information SI indicating the OFF setting changes to I/F setting information SI indicating the ON setting (S90: YES), the CPU 42 determines whether the printer PR is the error state or the no-error state in S91. S91 is the same as S10 of FIG. 2. In a case where it is determined that the printer PR is the error state (S91: YES), the CPU 42 performs S92 and S93. S92 and S93 are the same as S20 and S22 of FIG. 2. Alternatively, in a case where it is determined that the printer PR is the no-error state (S92: YES), the CPU 42 performs S94 and S95. S94 and S95 are the same as S30 and S32 of FIG. 2. When either S93 or S95 ends, the process returns to S50 of FIG. 3.

In S100, the CPU 42 monitors for a specific connection request from the portable terminal PT via the wireless LAN I/F 20. The specific connection request is a probe request, and includes the SSID in the wireless profile currently being stored in the main memory 44, that is, the SSID in the wireless profile prepared in S30 of FIG. 2, S64 of FIG. 3, or S94 of FIG. 4. The specific request is a request received in a situation where the printer PR operates in the G/O state, that is, a situation where the target wireless network is formed. When the specific connection request is received from the portable terminal PT, the CPU 42 makes a determination of YES in S100 and proceeds to S102.

In S102, the CPU 42 performs a connection process for establishing a wireless connection with the portable terminal PT that is the send-source of the specific connection request. Specifically, the CPU 42 sends a response signal (i.e. probe response) in response to the specific connection request to the portable terminal PT via the wireless LAN I/F 20. In addition, the CPU 42 performs a provision discovery request/response, an association request/response, an authentication request/response, a 4-way handshake or other such communication via the wireless LAN I/F 20. In this process, various information (e.g. authentication scheme, encryption scheme, password, and so forth) included in the wireless profile is sent from the portable terminal PT to the printer PR, and the CPU 42 uses the various information to perform an authentication of the portable terminal PT. In a case where the authentication of the portable terminal PT succeeds, the CPU 42 establishes a wireless connection with the portable terminal PT via the wireless LAN I/F 20. This makes it possible for the CPU 42 to allow the portable terminal PT that operates in the client state to participate in the target wireless network in which the printer PR operates in the G/O state.

In S104, the CPU 42 performs a print process. Specifically, the CPU 42 first uses the target wireless network to receive a printing instruction from the portable terminal PT via the wireless LAN I/F 20. The printing instruction is an instruction for causing the printer PR to perform a print function, and includes print data representing a print-target image. Next, the CPU 42 supplies the print data to the print performing unit 16, and causes the print performing unit 16 to perform printing of the image.

The print data is an image file or the like, and therefore has a comparatively large data size. The communication speed of an NFC communication is slower than the communication speed of a Wi-Fi communication. Therefore, it is supposed that when a configuration in which a wireless communication of the print data is performed between the printer PR and the portable terminal PT according to an NFC communication, it will take a long time for the printer PR to receive the print data. By contrast, in this example, a wireless communication of the print data is performed between the printer PR and the portable terminal PT according to a Wi-Fi communication, and as such, the printer PR is able to receive the print data quickly.

In S106, the CPU 42 transitions the printer PR from the G/O state to the device state, and terminates the target wireless network. The result is that the wireless connection between the printer PR and the portable terminal PT is disconnected. When S106 ends, the process returns to S50 of FIG. 3.

Figure 5:
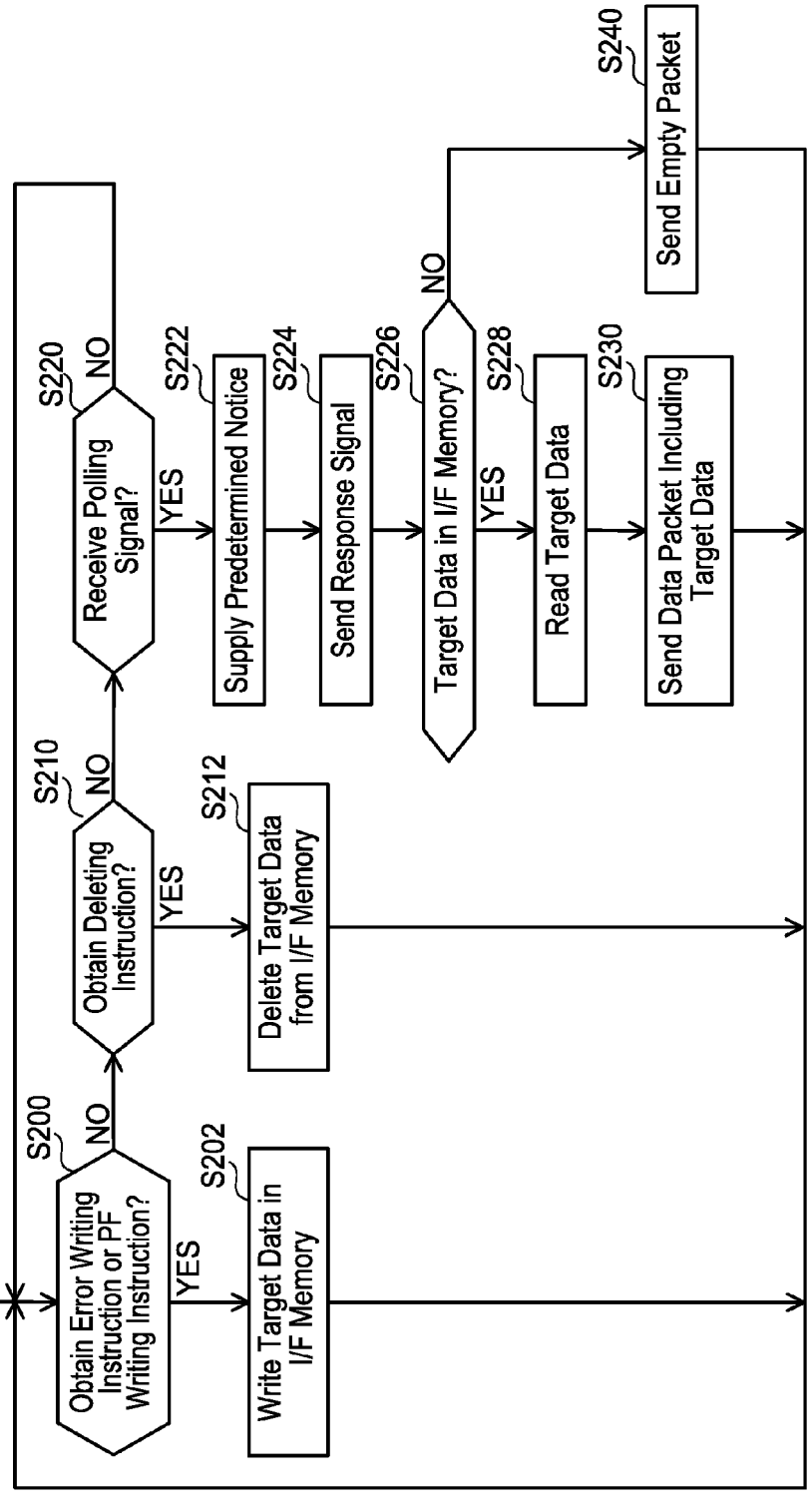
FIG. 5 shows a flowchart of process by a processor of NFC interface.

(Process of Processor 32; FIG. 5)

Next, the process performed by the processor 32 of the NFC I/F 30 will be explained by referring to FIG. 5. In the process of FIG. 5, the monitoring steps of S200, S210, and S220 are performed sequentially.

In S200, the processor 32 monitors obtaining either an error writing instruction (refer to S22 of FIG. 2, S56 of FIG. 3, and S93 of FIG. 4) or a PF writing instruction (refer to S32 of FIG. 2, S66 of FIG. 3, and S95 of FIG. 4) from the controller 40 (i.e. CPU 42). In a case where either an error writing instruction or a PF writing instruction is obtained from the controller 40, the processor 32 makes a determination of YES in S200, and in S202, writes in the I/F memory 34 a new target data TD (i.e. an error URL or a wireless profile) included in the writing instruction obtained in S200 in place of the old target data TD in the I/F memory 34. When S202 ends, the process returns to S200.

In S210, the processor 32 monitors obtaining a deleting instruction (refer to S34 of FIG. 2 and S82 of FIG. 4) from the controller 40. In a case where a deleting instruction is obtained from the controller 40, the processor 32 makes a determination of YES in S210, and in S212, deletes the target data TD from the I/F memory 34. When S212 ends, the process returns to S200.

In S220, the processor 32 monitors receiving from the portable terminal PT of a polling signal, which is a request signal for establishing a communication session. When the distance between the NFC I/F 30 of the printer PR and the NFC I/F of the portable terminal PT is equal to or less than a predetermined distance (e.g. 10 cm), the processor 32 receives the polling signal from the portable terminal PT, makes a determination of YES in S220, and proceeds to S222.

In S222, the processor 32 supplies the controller 40 (i.e. CPU 42) with a predetermined notice which is a notice indicating that a polling signal has been received. Consequently, a determination of YES is made by the CPU 42 in S70 of FIG. 3.

In S224, the processor 32 sends the portable terminal PT a response signal in response to the polling signal. Consequently, a communication session is established between the NFC I/F 30 of the printer PR and the NFC I/F of the portable terminal PT.

In S226, the processor 32 determines whether or not target data TD is stored in the I/F memory 34. In a case where it is determined that target data TD is stored in the I/F memory 34 (S226: YES), in S228, the processor 32 reads the target data TD from the I/F memory 34. Then, in S230, the processor 32 uses the communication session established in S224 so as to send a data packet that includes the target data TD to the portable terminal PT. When S230 ends, the process returns to S200.

After the target data TD has been deleted from the I/F memory 34 in S212, the target data TD is not stored in the I/F memory 34 prior to the target data TD being written in the I/F memory 34. In a situation like this, in S226, the processor 32 determines that target data TD is not stored in the I/F memory 34 (S226: NO). In this case, in S240, the processor 32 uses the communication session established in S224 so as to send an empty packet that does not include target data TD to the portable terminal PT. When S240 ends, the process returns to S200.

(Case A; FIG. 6)

Next, a specific case realized in accordance with the flowcharts of FIGS. 2 to 5 will be explained by referring to FIGS. 6 and 7. In the initial state of Case A of FIG. 6, in the printer PR, the I/F setting information SI in the main memory 44 is the ON setting and the no-error state. Therefore, a wireless profile is stored in the NFC I/F 30 as the target data TD (S32 of FIG. 2, S66 of FIG. 3, S95 of FIG. 4). Furthermore, the operation state of the printer PR is the power saving state.

The user of the portable terminal PT brings the portable terminal PT to approach the printer PR. Consequently, the distance between the NFC I/F 30 of the printer PR and the NFC I/F of the portable terminal PT becomes equal to or less than the predetermined distance (e.g. 10 cm), the NFC I/F 30 of the printer PR receives a polling signal 300 from the portable terminal PT (S220 of FIG. 5: YES), and supplies the controller 40 with a predetermined notice 301 (S222). As a result of this, the controller 40 shifts the operation state of the printer PR from the power saving state to the normal state (S75 of FIG. 3), transitions the printer PR from the device state to the G/O state, and forms a target wireless network (S78).

Also, the NFC I/F 30 of the printer PR sends a response signal 302 in response to the polling signal 300 (S224 of FIG. 5) to the portable terminal PT. As a result, a communication session is established between the NFC I/F 30 of the printer PR and the NFC I/F of the portable terminal PT. Then, the NFC I/F 30 uses the communication session so as to send the portable terminal PT a data packet 304 that includes a wireless profile which is the target data TD.

Thereafter, the controller 40 of the printer PR receives a specific connection request 306 including an SSID in a wireless profile from the portable terminal PT via the wireless LAN I/F 20 (S100 of FIG. 4: YES). In this case, the controller 40 performs a connection process for establishing a wireless connection with the portable terminal PT (S102). As a result, a wireless connection is established between the wireless LAN I/F 20 of the printer PR and the wireless LAN I/F of the portable terminal PT, and the portable terminal PT participates in the target wireless network. In this case, the controller 40 uses the target wireless network so as to receive a printing instruction 308 including print data from the portable terminal PT via the wireless LAN I/F 20, and performs a print process (S104). Then, the controller 40 transitions the printer PR from the G/O state to the device state, and terminates the target wireless network (S106). Consequently, the wireless connection between the printer PR and the portable terminal PT is disconnected.

As described above, in this embodiment, in a situation where I/F setting information SI indicating the ON setting is stored in the main memory 44, a data packet 304 that includes a wireless profile can be sent to the portable terminal PT. Therefore, the printer PR can establish a wireless connection according to the wireless profile with the portable terminal PT, and receive the printing instruction 308 from the portable terminal PT. In view of this possibility, in the printer PR, the operation state of the printer PR is shifted from the power saving state to the normal state in accordance with the predetermined notice 301, and power is supplied to the print performing unit 16. As a result, the printer PR performs a print function quickly in a case where the printing instruction 308 is received from the portable terminal PT.

Thereafter, the I/F setting information SI indicating the ON setting is changed to I/F setting information SI indicating the OFF setting in the printer PR as a result of the user operating the operation unit 12 (S80 of FIG. 4: YES). In this case, the controller 40 of the printer PR supplies a deleting instruction 310 to the NFC I/F 30 (S82). As a result, the target data TD which is the wireless profile is deleted from the NFC I/F 30 (S210 of FIG. 5: YES, S212). The operation state of the printer PR is shifted from the normal state to the power saving state when a predetermined time has passed without a predetermined event occurring after the operation unit 12 has been operated.

The user of the portable terminal PT once again brings the portable terminal PT to approach the printer PR. Consequently, the NFC I/F 30 of the printer PR receives a polling signal 320 from the portable terminal PT (S220 of FIG. 5: YES), and supplies a predetermined notice 321 to the controller 40 (S222). However, since the I/F setting information SI indicates the OFF setting, even though the predetermined notice 321 was received from the NFC I/F 30 (S70 of FIG. 3: YES), the controller 40 maintains the power saving state without shifting the operation state of the printer PR to the normal state (S72: NO).

Furthermore, the NFC I/F 30 of the printer PR sends the portable terminal PT a response signal 322 in response to the polling signal 320 (S224 of FIG. 5), and establishes a communication session with the portable terminal PT. However, since the target data TD is not stored in the NFC I/F 30, the NFC I/F 30 uses this communication session so as to send an empty packet 324 that does not include the target data TD (S226: NO, S240) to the portable terminal PT. Consequently, according to this embodiment, in a situation where the I/F setting information SI indicating the OFF setting is stored in the main memory 44, the sending of the wireless profile to the portable terminal PT can be appropriately suppressed.

As described above, in this embodiment, in a situation where I/F setting information SI indicating the OFF setting is stored in the main memory 44, the wireless profile is not sent to the portable terminal PT. Therefore, the printer PR does not normally received a printing instruction from the portable terminal PT. Thus, since there is no need to supply power to the print performing unit 16 in the printer PR, the operation state of the printer PR maintains the power saving state even though the predetermined notice 321 has been received. Consequently, it is possible to appropriately reduce the power consumption of the printer PR.

Thereafter, in the printer PR, the I/F setting information SI indicating the OFF setting is changed to I/F setting information SI indicating the ON setting (S90 of FIG. 4: YES). In this case, the controller 40 of the printer PR supplies a PF writing instruction 330 including a wireless profile to the NFC I/F 30 (S95). As a result, the target data TD which is the wireless profile is written to the NFC I/F 30 (S200 of FIG. 5: YES, S202). Consequently, according to this example, the wireless profile can be appropriately sent to the portable terminal PT in a situation where I/F setting information SI indicating the ON setting is stored in the main memory 44.

(Case B; FIG. 7)

The initial state of Case B of FIG. 7 is the same as the initial state of Case A of FIG. 6. For example, as a result of consumables running out, the printer PR transitions from the non-error state to the error state (S50 of FIG. 3: YES). In this case, the controller 40 of the printer PR supplies the NFC I/F 30 with an error writing instruction 400 including an error URL (S56). As a result, the error URL is written in the NFC I/F 30 in place of the wireless profile as the target data TD (S200 of FIG. 5: YES, S202).

Thereafter, the user of the portable terminal PT brings the portable terminal PT to approach the printer PR. Consequently, the NFC I/F 30 of the printer PR receives a polling signal 410 from the portable terminal PT (S220 of FIG. 5: YES), and supplies the controller 40 with a predetermined notice 411 (S222). As a result, the controller 40 shifts the operation state of the printer PR from the power saving state to the normal state (S75 of FIG. 3). However, because the printer PR is the error state, the controller 40 maintains the device state without transitioning the printer PR to the G/O state (S76: NO).

Furthermore, the NFC I/F 30 of the printer PR sends a response signal 412 to the portable terminal PT in response to the polling signal 410 (S224 of FIG. 5), and establishes a communication session with the portable terminal PT. Then the NFC I/F 30 uses this communication session so as to send the portable terminal PT a data packet 414 including an error URL which is the target data TD.

The portable terminal PT accesses the error URL and displays a web page indicating a method for resolving the error that is currently occurring in the printer PR. Consequently, the user is able to resolve the printer PR error.

As described above, in this embodiment, in a case where the printer PR transitions from the no-error state to the error state in a situation where I/F setting information SI indicating the ON setting is stored in the main memory 44, the target data TD in the NFC I/F 30 is changed from a wireless profile to an error URL. Therefore, the target data TD to be sent to the portable terminal PT can be appropriately changed in accordance with whether the printer PR is the non-error state or the error state.

The power consumption of the printer PR operating in the G/O state is normally higher than the power consumption of the printer PR operating in the device state. In this embodiment, the printer PR does not transition from the device state to the G/O state in a situation where the printer PR is the error state in which printing cannot be performed. Thus, the power consumption of the printer PR can be appropriately reduced.

(Case B1)

In a Case B1, as a result of the user operating the operation unit 12, I/F setting information SI indicating the ON setting is changed to I/F setting information SI indicating the OFF setting in the printer PR (S80 of FIG. 4: YES). In this case, the controller 40 of the printer PR supplies the NFC I/F 30 with a deleting instruction 420 (S82). As a result, the target data TD which is an error URL is deleted from the NFC I/F 30 (S210 of FIG. 5: YES, S212). The operation state of the printer PR is shifted from the normal state to the power saving state when a predetermined time has passed without a predetermined event occurring after the operation unit 12 has been operated.

The user of the portable terminal PT once again brings the portable terminal PT to approach the printer PR. Consequently, the NFC I/F 30 of the printer PR receives a polling signal 430 from the portable terminal PT (S220 of FIG. 5: YES), and supplies a predetermined notice 431 to the controller 40 (S222). However, even though the predetermined notice 431 has been obtained from the NFC I/F 30 (S70 of FIG. 3: YES), since the I/F setting information SI indicates the OFF setting, the controller 40 maintains the power saving state without shifting the operation state of the printer PR to the normal state (S72: NO). Consequently, according to this embodiment, the power consumption of the printer PR can be appropriately reduced.

Furthermore, the NFC I/F 30 of the printer PR sends a response signal 432 to the portable terminal PT in response to the polling signal 430 (S224 of FIG. 5), and establishes a communication session with the portable terminal PT. However, because the target data TD is not stored in the NFC I/F 30, the NFC I/F 30 uses this communication session so as to send an empty packet 434 that does not include an error URL (S226: NO, S240) to the portable terminal PT. Consequently, according to this embodiment, the sending of the error URL to the portable terminal PT can be appropriately suppressed in a situation where I/F setting information SI indicating the OFF setting is stored in the main memory 44.

(Case B2)

In a Case B2, for example, the printer PR transitions from the error state to the no-error state (S60 of FIG. 3: YES) as a result of consumables being set in the printer PR by the user. In this case, the controller 40 of the printer PR supplies a PF writing instruction 440 including a wireless profile to the NFC I/F 30 (S66). As a result, a wireless profile is written in the NFC I/F 30 as the target data TD in place of an error URL (S200 of FIG. 5: YES, S202). Consequently, according to this embodiment, the target data TD to be sent to the portable terminal PT can be appropriately changed in accordance with whether the printer PR is the no-error state or the error state.

(Summary of Operations of Controller 40 of Printer PR; FIG. 8)

A summary of the operations of controller 40 of the printer PR realized in this example will be explained by referring to FIG. 8. In a first situation where the printer PR is the no-error state and the I/F setting information SI in the main memory 44 indicates the ON setting, the controller 40 writes a wireless profile in the I/F memory 34 of the NFC I/F 30 (S32 of FIG. 2, S66 of FIG. 3, and S95 of FIG. 4). Then, in the above first situation and a situation where the operation state of the printer PR is the power saving state, the controller 40 shifts the operation state of the printer PR from the power saving state to the normal state when a predetermined notice is obtained from the NFC I/F 30 (S75 of FIG. 3). As a result of this, the printer PR is able to quickly perform a print function when a printing instruction is received from the portable terminal PT.

In a second situation where the printer PR is the no-error state and the I/F setting information SI in the main memory 44 indicates the OFF setting, the controller 40 does not write a wireless profile in the I/F memory 34 of the NFC I/F 30 (S2 of FIG. 2: NO, S62 of FIG. 3: NO, S80 of FIG. 4: YES, S82). Then, in the above second situation and a situation where the operation state of the printer PR is the power saving state, the controller 40 maintains the power saving state without shifting the operation state of the printer PR to the normal state when a predetermined notice is obtained from the NFC I/F 30 (S72 of FIG. 3: NO). As a result, the power consumption of the printer PR can be appropriately reduced. Consequently, in either the first situation or the second situation described above, the controller 40 is able to change whether or not the operation state of the printer PR is shifted to the normal state when a predetermined notice is obtained, and as a result, is able to appropriately control the operation state of the printer PR.

Furthermore, in a third situation where the printer PR is the error state and the I/F setting information SI in the main memory 44 indicates the ON setting, the controller 40 writes an error URL in the I/F memory 34 of the NFC I/F 30 (S22 of FIG. 2, S56 of FIG. 3, and S93 of FIG. 4). Then, in the above third situation and a situation where the operation state of the printer PR is the power saving state, the controller 40 switches the operation state of the printer PR from the power saving state to the normal state when a predetermined notice is obtained from the NFC I/F 30 (S75 of FIG. 3).

In a fourth situation where the printer PR is the error state and the I/F setting information SI in the main memory 44 indicates the OFF setting, the controller 40 does not write an error URL in the I/F memory 34 of the NFC I/F 30 (S2 of FIG. 2: NO, S52 of FIG. 3: NO, S80 of FIG. 4: YES, S82). Then, in the above fourth situation and a situation where the operation state of the printer PR is the power saving state, the controller 40 maintains the power saving state without shifting the operation state of the printer PR to the normal state when a predetermined notice is obtained from the NFC I/F 30 (S72 of FIG. 3: NO). As a result, the power consumption of the printer PR can be appropriately reduced. Consequently, in either the third situation or the fourth situation described above, the controller 40 is able to change whether or not the operation state of the printer PR is shifted to the normal state when a predetermined notice is obtained, and as a result, is able to appropriately control the operation state of the printer PR.

Furthermore, in a modification, the controller 40 may write status information indicating the status of the printer PR in the I/F memory 34 of the NFC I/F 30 in the above second situation and fourth situation. The status information, for example, may include a message indicating that the I/F setting information SI indicates the OFF setting. According to this configuration, the status information of the printer PR can be sent to the portable terminal PT without a wireless profile or an error URL being sent to the portable terminal PT in either the second situation or the fourth situation mentioned above. Thus, the user of the portable terminal PT is able to learn that I/F setting information SI indicating the OFF setting is stored in the printer PR. Therefore, because the user obtains a wireless profile and so forth from the printer PR, the user is able to learn that the I/F setting information SI should be changed from the OFF setting to the ON setting. In another modification, the above status information, for example, may include a message indicating that the power source of the printer PR is the ON state.

(Correspondence Relationships)

The printer PR, print performing unit 16, and portable terminal PT are examples of a "function performing apparatus", a "function performing unit", and an "external apparatus", respectively. The NFC I/F 30 and the wireless LAN I/F 20 are examples of a "first wireless interface" and a "second wireless interface", respectively. The main memory 44 and the I/F memory 34 are examples of a "setting information memory" and an "interface memory", respectively. The I/F setting information SI, the ON setting, and the OFF setting are examples of "setting information", a "first setting" and a "second setting", respectively. The wireless profile and the error URL are examples of a "first target data" and a "second target data", respectively. The print function and the printing instruction are examples of a "specific function" and a "function performing instruction", respectively. The printer PR operating in the G/O state and the portable terminal PT operating in the client state are examples of a "parent station" and a "child station", respectively. In FIG. 6, the deleting instruction 310 and the PF writing instruction 330 are examples of a "first deleting instruction" and a "first writing instruction", respectively. In FIG. 7, the error writing instruction 400, the deleting instruction 420, and the PF writing instruction 440 are examples of a "second writing instruction", a "second deleting instruction" and a "third writing instruction", respectively.

Second Embodiment

A second embodiment will be explained from the standpoint of the differences with the first embodiment. As shown in FIG. 8, in the first embodiment, the controller 40 of the printer PR shifts the operation state of the printer PR from the power saving state to the normal state when a predetermined notice is obtained from the NFC I/F 30 in the third situation. Alternatively, in this embodiment, the controller 40 maintains the power saving state without shifting the operation state of the printer PR to the normal state in the third situation even when a predetermined notice is obtained from the NFC I/F 30.

(Monitoring Process of CPU 42; FIG. 9)

In this embodiment, the CPU 42 performs the process of FIG. 9 in place of the process of FIG. 3. S50 to S72 of FIG. 9 are the same as in FIG. 3. In a case where a determination of YES has been made in S72, in S73, the CPU 42 determines whether the printer PR is the no-error state or the error state. In a case where it is determined that the printer PR is the error state (S73: NO), the CPU 42 skips S74 and subsequent process, and returns to S50. Alternatively, in a case where the CPU 42 determines that the printer PR is the no-error state (S73: YES), the process proceeds to S74. S74, S75, S77, and S78 are the same as in FIG. 4.

(Case C; FIG. 10)

Next, a specific Case C realized by this example will be explained by referring to FIG. 10. The initial state of Case C of FIG. 10 is the same as the initial state of Case A of FIG. 6 (i.e. the initial state of Case B of FIG. 7).

The printer PR transitions from the non-error state to the error state (S50 of FIG. 3: YES). In this case, the supplying of an error writing instruction 500 and the writing of an error URL in the NFC I/F 30 are the same as Case B of FIG. 7.

Thereafter, the user of the portable terminal PT brings the portable terminal PT to approach the printer PR. In this case, the communicating of a polling signal 510, a response signal 512, and a data packet 514 between the printer PR and the portable terminal PT is the same as Case B of FIG. 7. However, because the printer PR is the error state, the controller 40 of the printer PR maintains the power saving state without shifting the operation state of the printer PR to the normal state even though a predetermined notice 511 is obtained from the NFC I/F 30 (S73 of FIG. 9: NO).

As shown in Case C, an error URL is sent to the portable terminal PT in a situation where the printer PR is the error state even though I/F setting information SI indicating the ON setting is stored in the main memory 44, but a wireless profile is not sent to the portable terminal PT. Therefore, the printer PR does not normally receive a printing instruction from the portable terminal PT. Thus, since there is no need to supply power to the print performing unit 16 in the printer PR, the operation state of the printer PR is maintained in the power saving state even though a predetermined notice 511 is obtained. Consequently, the power consumption of the printer PR can be appropriately reduced.

Modification 1

The "function performing apparatus" need not be a printer PR provided with a print performing unit that performs a print function, and may be a scanner provided with a scan performing unit that performs a scan function. In this modification, for example, a scanner may comprise an NFC I/F and a wireless LAN I/F the same as the above embodiment. The NFC I/F may store a wireless profile, and may send this wireless profile to the portable terminal PT. Then, the CPU of the scanner may establish a wireless connection with the portable terminal PT via the wireless LAN I/F in a case where a connection request is received from the portable terminal PT via the wireless LAN I/F, and may use this wireless connection to receive a scan request from the portable terminal PT. In this case, the CPU may cause the scan performing unit to perform a scan of a manuscript, and use the above wireless connection to send the scanned data to the portable terminal PT. In this modification, the scan performing unit, the scan function, and the scan request are examples of a "function performing unit", a "specific function", and a "function performing instruction", respectively.

Modification 2

The CPU 42 need not use a wireless connection to receive a printing instruction from the portable terminal PT after establishing the wireless connection with the portable terminal PT via the wireless LAN I/F 20. In this case, for example, the CPU 42 may use the above wireless connection to request that the portable terminal PT send print data, and may use the above wireless connection to receive the print data from the portable terminal PT.

Modification 3

In S78 of FIG. 3, the CPU 42 forms a wireless network by transitioning the state of the printer PR from the device state to the G/O state of the WFD scheme. Instead of this, the CPU 42 may form a wireless network in which the printer PR operates as an access point (AP) by booting up a so-called SoftAP. In this modification, in S30 of FIG. 2, S64 of FIG. 3, and S94 of FIG. 4, the CPU 42 prepares a wireless profile (SSID, password, and so forth) to be used in the wireless network. Also, in S102 of FIG. 4, the CPU 42 establishes a wireless connection with the portable terminal PT via the wireless LAN I/F 20 to allow the portable terminal PT to participate in the wireless network. In this modification, the printer PR operating as an AP is an example of a "parent station", and the wireless profile of the wireless network on which the printer PR operates as an AP is an example of a "first target data". Also, the printer PR operating as an AP and the portable terminal PT establishing a wireless connection with the printer PR that operates as an AP are examples of a "parent station" and a "child station", respectively.

Modification 4

The "first target data" is not limited to the wireless profile of the wireless network. For example, in a situation where the printer PR and the portable terminal PT are already connected to the same wired LAN, the "first target data" may be the IP address of the printer PR on the wired LAN. In this case, when the portable terminal PT performs an NFC communication and receives the IP address of the printer PR from the printer PR, the portable terminal PT may use this IP address to send a printing instruction to the printer PR via the above wired LAN. Generally speaking, the "first target data" may include data for performing a communication related to a specific function. Also, in this modification, the "second wireless interface" can be omitted.

Modification 5

The "second target data" is not limited to the error URL, and, for example, may be a message showing the name of an error (for example, out of consumables, paper jam, or the like) that occurs in the printer PR. Generally speaking, the "second target data" may include data related to an error state.

Modification 6

In the above embodiments, the CPU 42 receives a predetermined notice from the processor 32 of the NFC I/F 30 (S70 of FIG. 3: YES) after a polling signal has been received from the portable terminal PT (i.e. after S220 of FIG. 5: YES) and before a communication session is established with the portable terminal PT (i.e. before S224). Instead of this, the CPU 42 may receive the predetermined notice from the processor 32 after the polling signal has been received from the portable terminal PT and the communication session with the portable terminal PT has been established. That is, the "predetermined notice" may be obtained prior to the communication session being established with the external apparatus, or may be obtained after the communication session has been established with the external apparatus. Also, the CPU 42 need not receive the predetermined notice from the processor 32 of the NFC I/F 30 in accordance with a polling signal having been received from the portable terminal PT. For example, the CPU 42 may receive the predetermined notice from the processor 32 in accordance with having received from the portable terminal PT a read signal for requesting a target data TD read after the polling signal has been received from the portable terminal PT. Also, for example, the CPU 42 may receive the predetermined notice from the processor 32 in accordance with having received from the portable terminal a confirmation signal for confirming whether or not a communication session is established after the polling signal has been received from the portable terminal PT. All of the aforementioned modifications are included in the configuration in which "obtaining, from the processor, a predetermined notice indicating that the request signal has been received from the external apparatus".

Modification 7

In the above embodiments, in S82 of FIG. 4, the CPU 42 supplies the NFC I/F 30 with a deleting instruction for deleting the target data TD from the I/F memory 34. Instead of this, the CPU 42 may supply the NFC I/F 30 with a prohibiting instruction for prohibiting the sending of the target data TD without deleting the target data TD from the I/F memory 34. The prohibiting instruction, for example, may be an instruction for writing predetermined information in the header block of the I/F memory 34. In this case, the NFC I/F 30, after having obtained a prohibiting instruction from the CPU 42 (i.e. in a state where the predetermined information is written in the header block), does not send the target data TD in the I/F memory 34 to the portable terminal PT even though a communication session with the portable terminal PT has been established. Also, in a case where a determination of YES is made in S90 of FIG. 4, in place of S91 to S95, the CPU 42 may supply the NFC I/F 30 with a permitting instruction for permitting the sending of the target data TD. The permitting instruction, for example, may be an instruction for deleting predetermined information from the header block of the I/F memory 34. In this case, the NFC I/F 30, after having obtained a permitting instruction from the CPU 42 (i.e. in a state where the predetermined information is not written in the header block), sends the target data TD in the I/F memory 34 to the portable terminal PT when a communication session with the portable terminal PT is established. In this modification as well, the sending of the target data TD to the portable terminal PT can be appropriately suppressed in a case where the I/F setting information SI indicates the OFF setting.

Modification 8

In the above embodiments, the CPU 42 writes an error URL in the I/F memory 34 rather than a wireless profile in a case where the printer PR is the error state (S22 of FIG. 2, S56 of FIG. 3, and S93 of FIG. 4). Instead of this, the CPU 42 may write a wireless profile in the I/F memory 34 regardless of whether the printer PR is the error state or the non-error state.

Modification 9

Rather than an NFC Forum tag, the NFC I/F 30 may be an NFC Forum device comprising the processor 32 and the I/F memory 34. Also, in place of the NFC I/F 30, the printer PR may comprise a wireless interface for performing a wireless communication in accordance with another scheme, such as a TransferJet scheme or a Bluetooth (registered trademark) scheme. Generally speaking, the "first wireless interface" may be a wireless interface that comprises a processor and an interface memory.

Modification 10

The "external apparatus" is not limited to the portable terminal PT, and may be a PC, a printer, a scanner, a copy apparatus, a multifunction apparatus, or a server.

Modification 11

In the above-described embodiments, the various processes of FIGS. 2 to 4 and FIG. 9 are realized by the CPU 42 of the printer PR executing a program PG (i.e. software) in the main memory 44. Instead of this, at least one of these processes may be realized by a logical circuit or other such hardware.

What is claimed is:
1. A function performing apparatus comprising:
a first wireless interface;
a function performing unit configured to perform a specific function; and
a controller,
wherein the first wireless interface comprises:
an interface memory in which first target data is to be written, the first target data including data for performing communication related to the specific function between the function performing apparatus and an external apparatus; and
a processor configured to establish a communication session with the external apparatus via the first wireless interface so as to send the first target data in the interface memory to the external apparatus, in a case where a request signal for establishing the communication session is received from the external apparatus under a situation where the first target data has been written in the interface memory,
wherein the controller comprises:
a setting information memory configured to store setting information indicating a selected result selected by a user among a first setting and a second setting, the first setting indicating that the first target data is to be sent to the external apparatus, and the second setting indicating that the first target data is not sent to the external apparatus,
wherein the controller is configured to perform:
obtaining, from the processor, a predetermined notice indicating that the request signal has been received from the external apparatus; and
shifting an operation state of the function performing apparatus between a normal state and a power saving state, a power consumption of the function performing unit in the power saving state being lower than a power consumption of the function performing unit in the normal state, and
the shifting of the operation state includes:
shifting the operation state of the function performing apparatus from the power saving state to the normal state, in a case where the predetermined notice is obtained from the processor under a situation where the operation state of the function performing apparatus is the power saving state and the setting information memory stores the setting information indicating the first setting; and
maintaining the power saving state without shifting the operation state of the function performing apparatus to the normal state, in a case where the predeter- mined notice is obtained from the processor under a situation where the operation state of the function performing apparatus is the power saving state and the setting information memory stores the setting information indicating the second setting.

2. The function performing apparatus as in claim 1, further comprising:
a second wireless interface being different from the first wireless interface,
wherein the first target data includes data for establishing a wireless connection via the second wireless interface with the external apparatus,
the controller is configured to further perform:
establishing the wireless connection via the second wireless interface with the external apparatus after the first target data has been sent to the external apparatus via the first wireless interface; and
causing the function performing unit to perform the specific function, in a case where a function performing instruction for causing the function performing apparatus to perform the specific function is obtained from the external apparatus by using the wireless connection via the second wireless interface.

3. The function performing apparatus as in claim 2, wherein
the controller is configured to further perform:
operating as a parent station of a wireless network so as to form the wireless network, in a case where the predetermined notice is obtained from the processor under a situation where the setting information memory stores the setting information indicating the first setting, and
the establishing includes establishing the wireless connection via the second wireless interface with the external apparatus so as to cause the external apparatus to participate in the wireless network as a child station of the wireless network.

4. The function performing apparatus as in claim 1, wherein
the controller is configured to further perform:
supplying to the processor a first deleting instruction for deleting the first target data from the interface memory, in a case where the setting information memory stores the setting information indicating the second setting in place of the setting information indicating the first setting, under the situation where the first target data has been written in the interface memory.

5. The function performing apparatus as in claim 4, wherein
the controller is configured to further perform:
supplying to the processor a first writing instruction for writing the first target data in the interface memory, in a case where the setting information memory stores the setting information indicating the first setting in place of the setting information indicating the second setting.

6. The function performing apparatus as in claim 1, wherein
the controller is configured to further perform:
supplying to the processor a second writing instruction for writing, in place of the first target data, second target data related to an error state in the interface memory, in a case where the function performing apparatus transitions from a no-error state to the error state under a situation where the first target data has been written in the interface memory and the setting information memory stores the setting information indicating the first setting.

7. The function performing apparatus as in claim 6, wherein
the controller is configured to further perform:
supplying to the processor a third writing instruction for writing, in place of the second target data, the first target data in the interface memory, in a case where the function performing apparatus transitions from the error state to the no-error state under a situation where the second target data has been written in the interface memory and the setting information memory stores the setting information indicating the first setting.

8. The function performing apparatus as in claim 6, wherein
the controller is configured to further perform:
supplying to the processor a second deleting instruction for deleting the second target data from the interface memory, in a case where the setting information memory stores the setting information indicating the second setting in place of the setting information indicating the first setting under a situation where the second target data has been written in the interface memory.

9. The function performing apparatus as in claim 6, wherein
the shifting of the operation state includes:
shifting the operation state of the function performing apparatus from the power saving state to the normal state, in a case where the predetermined notice is obtained from the processor under a situation where the operation state of the function performing apparatus is the power saving state, the setting information memory stores the setting information indicating the first setting, and the first target data has been written in the interface memory; and
maintaining the power saving state without shifting the operation state of the function performing apparatus to the normal state, in a case where the predetermined notice is obtained from the processor under a situation where the operation state of the function performing apparatus is the power saving state, the setting information memory stores the setting information indicating the first setting, and the second target data has been written in the interface memory.

10. The function performing apparatus as in claim 6, wherein
the controller is configured to further perform:
operating as a parent station of a wireless network so as to form the wireless network, in a case where the predetermined notice is obtained from the processor under a situation where the setting information memory stores the setting information indicating the first setting and the function performing apparatus is in the no-error state, and
the controller is configured not to operate as the parent station of the wireless network and not to form the wireless network, in a case where the predetermined notice is obtained from the processor under a situation where the setting information memory stores the setting information indicating the first setting and the function performing apparatus is in the error state.

11. The function performing apparatus as in claim 1, wherein the first wireless interface is an interface for performing a near field wireless communication according to a Near Field Communication scheme.

12. The function performing apparatus as in claim 1, wherein
the communication related to the specific function includes receiving print data representing an image of a print target from the external apparatus, and
the specific function is a print function of performing print according to the print data.

13. The function performing apparatus as in claim 1, wherein
the normal state is a state in which electricity power is supplied to the function performing unit; and
the power saving state is a state in which the electricity power is not supplied to the function performing unit.

14. A non-transitory computer-readable recording medium storing computer-readable instructions for a function performing apparatus,
wherein the function performing apparatus comprises:
a first wireless interface;
a function performing unit configured to perform a specific function; and
a controller,
wherein the first wireless interface comprises:
an interface memory in which first target data is to be written, the first target data including data for performing communication related to the specified function between the function performing apparatus and an external apparatus; and
a processor is configured to establish a communication session with the external apparatus via the first wireless interface so as to send the first target data in the interface memory to the external apparatus, in a case where a request signal for establishing the communication session is received from the external apparatus under a situation where the first target data has been written in the interface memory,
wherein the controller comprises:
a setting information memory configured to store setting information indicating a selected result selected by a user among a first setting and a second setting, the first setting indicating that the first target data is to be sent to the external apparatus, and the second setting indicating that the first target data is not sent to the external apparatus,
wherein the computer-readable instructions, when executed by the controller, cause the function performing apparatus to perform:
obtaining, from the processor, a predetermined notice indicating that the request signal has been received from the external apparatus; and
shifting an operation state of the function performing apparatus between a normal state and a power saving state, a power consumption of the function performing unit in the power saving state being lower than a power consumption of the function performing unit in the normal state, and
the shifting of the operation state includes:
shifting the operation state of the function performing apparatus from the power saving state to the normal state, in a case where the predetermined notice is obtained from the processor under a situation where the operation state of the function performing apparatus is the power saving state and the setting information memory stores the setting information indicating the first setting; and
maintaining the power saving state without shifting the operation state of the function performing apparatus to the normal state, in a case where the predetermined notice is obtained from the processor under a situation where the operation state of the function performing apparatus is the power saving state and the setting information memory stores the setting information indicating the second setting.

15. A method performed by a controller of a function performing apparatus,
wherein the function performing apparatus comprises:
a first wireless interface; and
a function performing unit configured to perform a specific function,
wherein the first wireless interface comprises:
an interface memory in which first target data is to be written, the first target data including data for performing communication related to the specific function among the function performing apparatus and an external apparatus; and
a processor configured to establish a communication session with the external apparatus via the first wireless interface so as to send the first target data in the interface memory to the external apparatus, in a case where a request signal for establishing the communication session is received from the external apparatus under a situation where the first target data has been written in the interface memory,
wherein the controller comprises:
a setting information memory configured to store a setting information indicating a selected result selected by a user among a first setting and a second setting, the first setting indicating that the first target data is to be sent to the external apparatus, and the second setting indicating that the first target data is not sent to the external apparatus,
the method comprising:
maintaining an operation state of the function performing apparatus in a power saving state without shifting the operation state of the function performing apparatus to a normal state, in a case where a predetermined notice is obtained from the processor under a situation where the operation state of the function performing apparatus is the power saving state and the setting information memory stores the setting information indicating the second setting, the predetermined notice indicating that the request signal has been received from the external apparatus, a power consumption of the function performing unit in the power saving state being lower than a power consumption of the function performing unit in the normal state; and
shifting the operation state of the function performing apparatus from the power saving state to the normal state, in a case where the predetermined notice is obtained from the processor under a situation where the operation state of the function performing apparatus is the power saving state and the setting information memory stores the setting information indicating the first setting.

* * * * *